(12) United States Patent
Dousson et al.

(10) Patent No.: US 7,388,482 B2
(45) Date of Patent: Jun. 17, 2008

(54) METHOD FOR THE MACHINE LEARNING OF FREQUENT CHRONICLES IN AN ALARM LOG FOR THE MONITORING OF DYNAMIC SYSTEMS

(75) Inventors: Christophe Dousson, Lannion (FR); Fabrice Clerot, Louannec (FR); Francoise Fessant, Pleumeur Bodou (FR)

(73) Assignee: France Telecom, Paris (FR)

( * ) Notice: Subject to any disclaimer, the term of this patent is extended or adjusted under 35 U.S.C. 154(b) by 171 days.

(21) Appl. No.: 10/554,303

(22) PCT Filed: May 25, 2004

(86) PCT No.: PCT/FR2004/050205

§ 371 (c)(1),
(2), (4) Date: Oct. 26, 2005

(87) PCT Pub. No.: WO2004/107652

PCT Pub. Date: Dec. 9, 2004

(65) Prior Publication Data

US 2006/0208870 A1    Sep. 21, 2006

(30) Foreign Application Priority Data

May 27, 2003 (FR) .................................. 03 50181

(51) Int. Cl.
 *G08B 29/00*  (2006.01)
(52) U.S. Cl. ...................... 340/506; 340/3.1; 340/3.2
(58) Field of Classification Search ................ 340/506, 340/3.1, 3.2
See application file for complete search history.

(56) References Cited

U.S. PATENT DOCUMENTS 5,400,246 A * 3/1995 Wilson et al. ................ 700/17

FOREIGN PATENT DOCUMENTS

FR        2 821 508        8/2002

OTHER PUBLICATIONS

Emmanuel Marilly, et al., "Alarm correlation for complex telecommunication networks using neural networks and signal processing", IEEE, pp. 3-7 Oct. 29, 2002.
Steffen Lipperts, "Enabling alarm correlation for a mobile agent based system and network management—a wrapper concept", IEEE, pp. 125-132 Sep. 28, 1999.
Emad Aboelela, et al., "Switching theory approach to alarm correlation in network management", IEEE, pp. 452-461 Nov. 8, 2000.

(Continued)

*Primary Examiner*—Daryl C Pope
(74) *Attorney, Agent, or Firm*—Oblon, Spivak, McClelland, Maier & Neustadt, P.C.

(57) ABSTRACT

An automatic method for learning frequent chronicles in an alarm log of a dynamic system for supervision of the system, and a learning system for using the method in a supervision system. According to the method, in an alarm log, alarm sequences are selected and then grouped in groups of similar sequences. Alarms of the groups are then used to produce partial logs. Frequent chronicles are then learned on each transmitted partial log and the partial set of frequent chronicles is determined. Then a set of chronicles in the log is formed with chronicles of the various partial sets.

20 Claims, 4 Drawing Sheets

OTHER PUBLICATIONS

T. Kohonen, "Self-Organizing Map", third edition, Springer-Verlag 2002.

J.J.Verbeek, et al., "The Generative Self-Organizing Map", IAS Technical Report IAS-UVA-02-03 2002.

Heikki Mannila, et al., "Discovering frequent episodes in sequences, extended abstract", In Proc.1st International Conference on Knowledge Discovery and Data Mining, pp. 210-215 1995.

Heikki Mannila, et al., "Multiple uses of frequent sets and condensed representations, extended abstract", In Proc.2nd International Conference on Knowledge Discovery and Data Mining, pp. 189-194 1996.

Rakesh Agrawal, et al., "Fast discovery of association rules", Advances in Knowledge Discovery and Data Mining, pp. 307-328 1996.

Rina Dechter, et al., "Temporal constraint networks", Artificial Intelligence, vol. 49, pp. 61-95 1991.

Christophe Dousson, et al., "Discovering chronicles with numerical time constraints from alarm logs for monitoring dynamic systems", In Proc. of the 6th International Joint Conference on Artificial Intelligence, pp. 620-626 1999.

Michael Dittenbach, et al., "The growing hierarchical self-organizing map", IEEE Computer Society, vol. vi, pp. 15-19 2000.

T.Vu Duong : "Découverte de chroniques á partir de journaux d'alarmes. Application á la supervision de réseaux de télécommunications" (Discovery of chronicles from alarm logs. Application to supervision of telecommunication networks), Thesis in data processing and telecommunications, Institut National Polytechnique de Toulouse Mar. 28, 2001.

* cited by examiner

METHOD FOR THE MACHINE LEARNING OF FREQUENT CHRONICLES IN AN ALARM LOG FOR THE MONITORING OF DYNAMIC SYSTEMS

TECHNICAL DOMAIN

The purpose of this invention is an automatic method and system for learning frequent chronicles in an alarm log of a dynamic system for supervision of this alarm log.

Examples of dynamic systems concerned by the invention include telecommunication networks, computer networks and any other industrial installations in which equipment is supervised, such as nuclear power stations, assembly lines, automated factories, etc.

Supervision of a dynamic system consists of monitoring that it is operating correctly, collecting information about its state or the state of components of the system, and detecting and identifying malfunctions that might occur. This supervision is usually done by a computer system that centralises information sent by components of the dynamic system at different times. The supervision system may receive a wide variety of information; for example, procedure execution information, alert messages; they are often related to physical sensor measurements.

The supervision system receives information in the form of alarms, each alarm being formed from a given type of event, for example a specific electrical equipment in the dynamic system is de-energised (in the form of a coded message), associated with its occurrence date (frequently in the form of an integer number of time units). In the case of a telecommunication network, examples of alarm types include "signal loss" or "transmission frame loss", that can be grouped under the more general type of "transmission failure".

Alarms received by the supervision system are stored in an alarm log corresponding to a list of received alarms ordered in time according to the occurrence dates between a log start date and end date.

A supervision system may receive a very large number of alarms with considerable variations during time; for example, the rate may vary from several hundred messages per second to a few tens or less. Some received alarms are not independent but are the result of alarm "cascades" due to the interdependence of some components of the supervised dynamic system.

An analysis of the alarm log, particularly to find the genuine causes of malfunctions in order to suggest an appropriate reaction (preventive or corrective) is a difficult task because relevant groups of alarms have to be isolated from the mass of information in the log. One possible representation for these alarm groups uses sets of events related by time constraints (in the form of graphs); these are called chronicles. Knowledge about the variation of a dynamic system may be represented by such chronicles because it can be considered that each chronicle is one possible scenario for evolution of the system. Therefore, this knowledge acquired through the chronicles provides a means of anticipating the behaviour of the dynamic system and thus enables better control over it.

Figure 1:
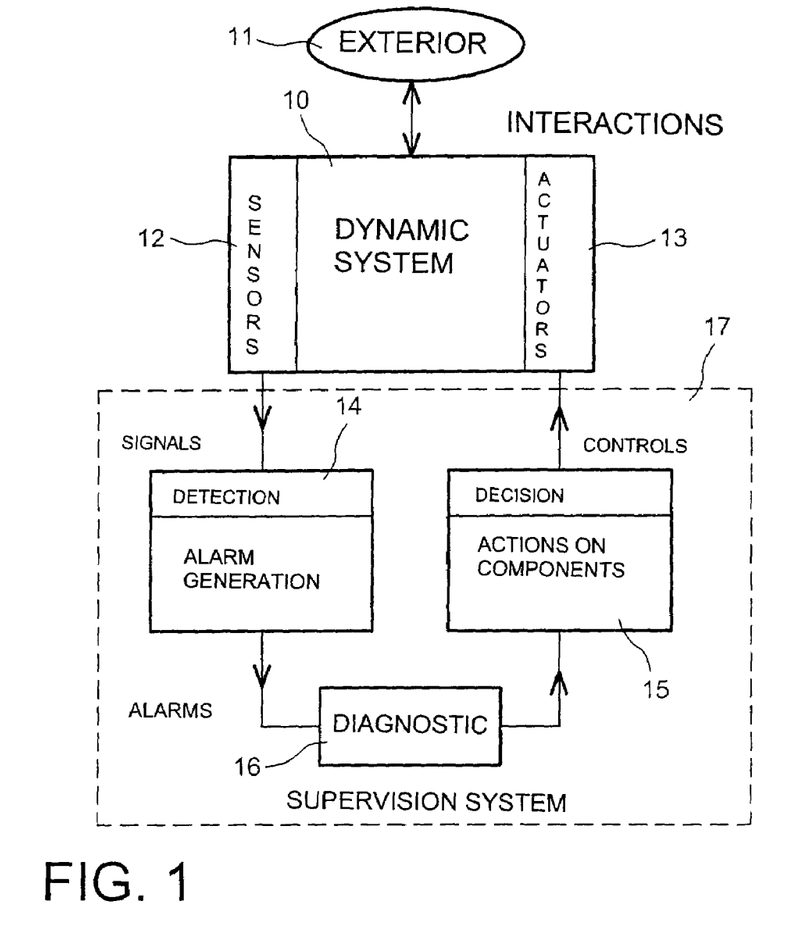
FIG. 1 shows a logical diagram of a supervision system for a dynamic system like that described above.

For example, in the case of telecommunication network, alarms are generated automatically by various network equipment (switches, multiplexers, mixers, etc.) and are sent to a central supervisor. The alarm flow then contains alarms due to network automation that can be qualified as being normal, and alarms related to malfunctions; if a chronicle corresponds to a malfunction, its alarms will be analysed to find the source of this malfunction and to correct it. Most supervision and control systems have an architecture in three modules 14, 16 and 15 as illustrated in FIG. 1; a supervision system 17 is connected to a dynamic system 10 interacting with the exterior 11, the components of which are provided with sensors 12 and that may be controlled by actuators 13; the sensors 12 send signals to a detection module 14 that generates alarms from these signals and transmits them to a diagnostic module 16 that interprets the alarms, identifies situations characteristic of the evolution 10, locates components of 10 involved in these situations, determines the causes of any malfunctions and transmits this information to a decision module 15 that then determines actions to be accomplished (to achieve a given objective or to bring the supervised system into a normal situation) on components of 10 and transmits commands accordingly to the actuators 13 of the dynamic system.

Learning of chronicles takes place in the diagnostic module and relevant information distributed throughout the alarm log is isolated. The identification of characteristic situations encountered during evolution of the dynamic system, particularly related to anomalies, and detection of the causes of these situations for diagnostic purposes, are based on chronicles discovered during learning. The chronicles thus provide a means of anticipating some behaviours of the dynamic system.

Therefore, discovery of the chronicles in an alarm log is an essential step for supervision of a dynamic system.

If an alarm is represented in the form of a pair $(A, t_A)$, where A denotes an event type and $t_A$ is its occurrence date, then the time constraint "from A to B" between two alarms $(A, t_A)$ and $(B, t_B)$ (or the constraint "from $t_A$ to $t_B$") represented by a time interval $[t^-, t^+]$ placed between events A and B, means that the following relation is valid for occurrence dates:

$$t^- \leq (t_B - t_A) \leq t^+,$$

the lack of a constraint between two instants being represented by the constraint $[-\infty, +\infty]$.

A chronicle (or scenario or time pattern) in the alarm log is composed of data consisting of k elements, where k is the size of the chronicle, in other words k event types in the log (or associated alarms) and time constraints between the corresponding k occurrence dates. It can be said that a chronicle is a set of event types for which the occurrence dates are constraints and these constraints may be in the form of a time graph.

A graph of time constraints is an oriented graph in which the vertices are dates and the arcs are labelled by constraints between these dates; for example for two dates $t_1$ and $t_2$, the arc from $t_1$ to $t_2$ is labelled by the constraint "from $t_1$ to $t_2$".

There may be many examples of production of a given chronicle C in the alarm log, and it is then said that there are several instances of chronicle C; therefore an instance of a chronicle C corresponds to a list of alarms in the chronicle (or events associated with these alarms), ordered in time and extracted from the log.

Figure 2:
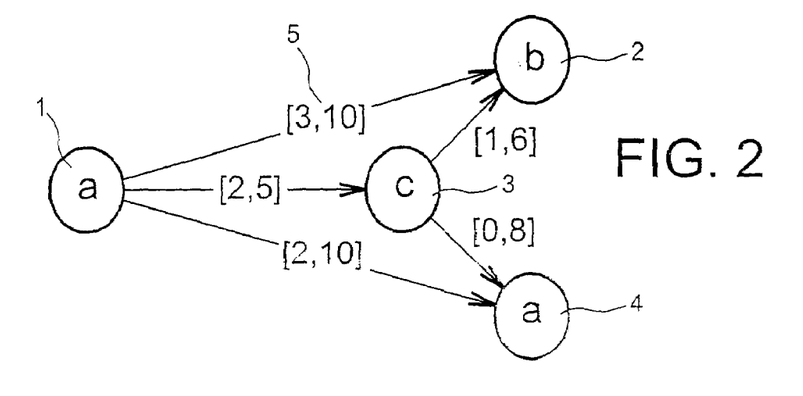
FIG. 2 shows an example of a chronicle using events of three types a, b and c.

FIG. 2 illustrates an example chronicle, involving event types a (in 1 or 4), b (in 2) and c (in 3) with indications of time intervals related to time constraints (for example 5); a type event (in 1) takes place at an initial time, it precedes a type c event (in 3) that occurs between 2 and 5 time units later, then a type b event occurs between 3 and 10 time units later and another type of event that occurs between 2 and 10 time units later (after the initial event), subsequent type b and a events, occurring between 1 and 6 time units and between 0 and 8 time units respectively after the type C event (in 3).

We will now consider a subsequent list of events e1 to e8, with reference to the chronicle in FIG. 2, in which for example event e1 corresponding to the occurrence of a type a alarm at date t=4 time units is denoted e1(a,t=4): e1(a,t=4), e2(d,t=5), e3(a,t=6), e4(c,t=8), e5(b,t=10), e6(e,t=11), e7(a, t=12), e8(b,t=14), in a list in which there are eight alarms (related to the eight events e1 to e8) with five different types denoted a, b, c, d, and e. In this example, four instances of the chronicle in FIG. 2, namely {e1,e4,e5,e7}, {e3,e4,e5, e7}, {e3,e4,e7,e8} and {e1,e4,e7,e8}, can be recognised that use the three types of alarms a, b and c and satisfy the relations between occurrence dates in the chronicle.

The frequency of a chronicle is the number of instances of this chronicle in the alarm log. Therefore, it is the real number of occurrences in the chronicle rather than a genuine frequency; however, a genuine frequency (or average occurrence rate) can be obtained trivially by dividing this number of occurrences by the duration of the alarm log, in other words the difference between its end and start dates, since the log is analysed at a given end date. The size (or length) of the alarm log is the number of alarms contained in it. The size of a chronicle is the number of events from which it is formed, in other words the size of its instances.

A chronicle is said to be frequent in a log when its frequency in the log exceeds a given threshold frequency $f_{min}$.

The learning method for frequent chronicles in an alarm log corresponds to exploration and analysis of the log to discover chronicles for which the frequency of instances in the log exceeds a given threshold frequency. The objective is to explore alarm sequences considering both events and time constraints between their occurrence dates to determine the chronicles, and also to recognise identified chronicles through their instances within the log (the number of times that a chronicle is recognised in the log being equal to its frequency).

STATE OF PRIOR ART

There are several algorithms [1,2,3,4] capable of constructing and discovering all frequent chronicles present in an alarm log, and many variants of these algorithms have been developed, particularly the FACE [4,6] (Frequency Analyser for Chronicle Extraction) system.

Automatic learning of chronicles on a computer is very expensive in calculation and memory occupancy terms, and furthermore, an excessive reduction in the threshold frequency (to find more unusual chronicles) can lead to a combinatorial explosion phenomenon that saturates the computer. The high cost is the reflection of the complexity of the method, which is mainly related to two factors: (i) the number of alarms present in the log (the size of the log to be processed) (ii) the threshold frequency fmin, fixed by the user that fixes the minimum frequency of chronicles to be looked for in the log.

It will be noted that concerning management of time constraints, a graph of time constraints may have several equivalent representations (therefore there will be the same number of equivalent representations of a corresponding chronicle) but there is only one minimum representation (in terms of a partial order relation); this representation is usually calculated and its global consistency is usually verified using a well known Floyd-Warshall type algorithm with a complexity of $O(n^3)$ where n is the number of instants (or dates) in the graph [5] and is therefore related to the number of alarms.

In practice, an expert in the subject fixes the maximum size $L_{max}$ of the time constraints, in other words the maximum duration between alarm occurrence dates in a chronicle (or duration of the chronicle), and the threshold frequency $f_{min}$ to learn chronicles in a given alarm log J, within a reasonable time. This <<reasonable time>> will obviously be different if the dynamic system supervision and control are done in real time and if the log is analysed off line, for example for expertise,acquisition needs.

Figure 3:
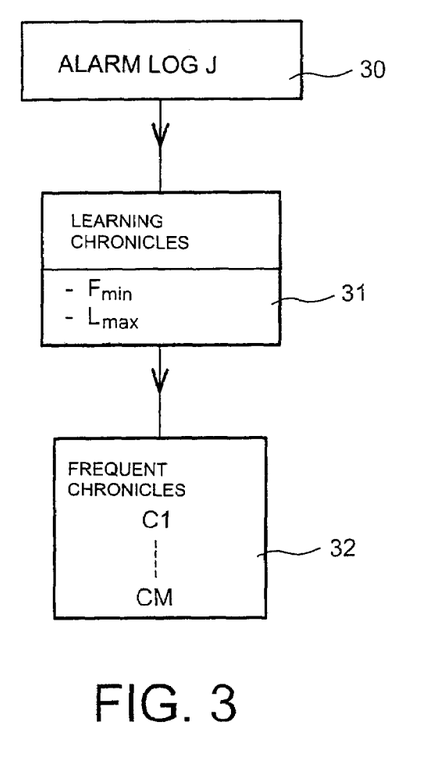
FIG. 3 is a block diagram showing learning of frequent chronicles according to prior art.

The result of learning is then the set E of chronicles in the log E={$C_1, \ldots, C_M$} with frequencies greater than or equal to $f_{min}$ and with durations less than or equal to $L_{max}$ as indicated in FIG. 3.

FIG. 3 indicates learning steps typical in prior art: an alarm log 30 is sent to a frequent chronicle learning module 31 with a threshold frequency $f_{min}$ and maximum size of time constraints $L_{max}$ 30, that then produces frequent chronicles of J: C1, . . . , CM in 32.

Figure 4:
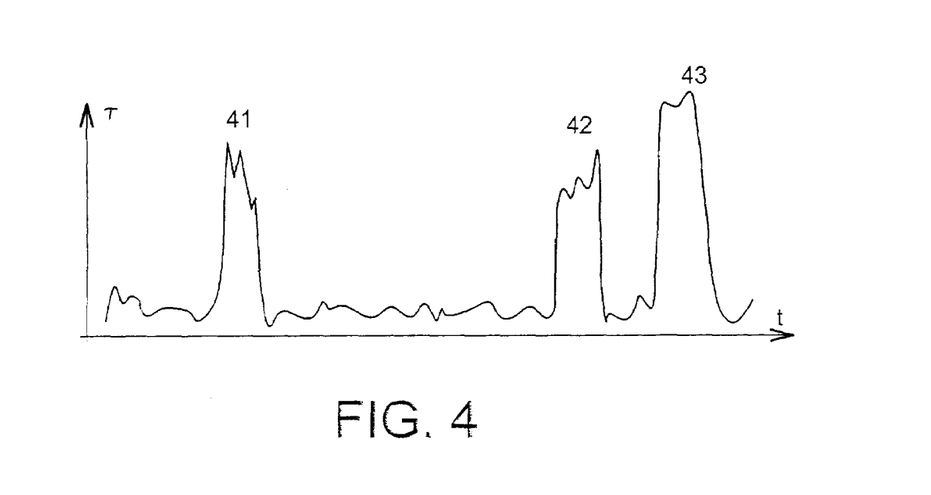
FIG. 4 shows a curve of the occurrence rate t (ordinate) of a pattern as a function of the time t (abscissa), typical of an epiphenomenon. Characteristic peaks 41, 42 and 43 are shown.

It frequently happens that those skilled in the art cannot reduce the threshold frequency $f_{min}$ (the second complexity factor (ii) mentioned above) below a relatively high level due to time constraints in the learning method, and in this case the important risk is that 'rare' chronicles with frequencies less than $f_{min}$ will be missed, but they may be very important for good supervision of a dynamic system. These cases apply particularly to epiphenomena. An epiphenomenon is the occurrence of a pattern in an alarm log with a high rate but over short intervals with respect to the duration of the log, on average the appearance rate of the pattern is very low and therefore its frequency is also very low particularly compared with $f_{min}$; FIG. 4 illustrates such a case. Prior art is incapable of learning chronicles associated with epiphenomena, for example by reducing the threshold frequency by a factor of ten, without significantly increasing calculation times.

In an attempt to solve this problem of detection of low frequency chronicles, those skilled in the art will vary the first complexity factor (i) to reduce the size of the alarm log based on the fact that, statistically, dividing the size of the log by a given factor divides the threshold frequency by a factor of the same order of magnitude (for a similar processing time). However, this technique is very difficult to implement and may have serious disadvantages; if alarm blocks are deleted from the log without adequate precautions, the risk of deleting chronicles, including high frequencies, is very high which degrades supervision and is hardly acceptable; as for epiphenomena, their frequencies will drop statistically even faster than the size of the log, which will make it even more difficult to discover them; if selected alarms are withdrawn from the log, this is usually done based on a prior analysis of this log (usually by experts), for example by eliminating alarms from some chronicles, and in this case the total processing time increases significantly; and in particular can make supervision in real time impossible.

These difficulties encountered by those skilled in the art illustrate the considerable practical importance of the time factor in learning, and it is clear that there is a need to be able to reduce the chronicle learning time, even when epiphenomena are not being searched for, in order to supervise dynamic systems or for the acquisition of knowledge (expertise) on these systems.

PRESENTATION OF THE INVENTION

The invention is thus intended to improve the processing speed of an application for learning the chronicles in an alarm log so that in particular the threshold frequency can be reduced, to search for chronicles corresponding to epiphenomena while maintaining acceptable processing times.

The invention uses data analysis techniques like those related to data classification (or clustering), in other words data grouping modes. There are very many algorithms that calculate such data aggregates or groups or clusters.

The invention relates to an automatic learning method comprising preprocessing of the alarm log without the disadvantages of prior art, for producing partial alarm logs (small sizes), starting from the original alarm log on which learning is done on each of them subsequently. This automatic "breakdown" into partial logs must be done 'intelligently' a systematic or random breakdown of the alarm log into alarm blocks does nothing to improve the frequencies if the patterns are distributed at random; this type of breakdown is incapable of producing low frequency learning since the frequency of an epiphenomenon will drop faster than the size of the log.

The automatic breakdown preprocessing according to the invention assures that the partial logs will be rich in alarm sequences that resemble each other in terms of the alarms produced.

In particular, concerning the epiphenomenona, this preprocessing tends to select areas in the alarm log corresponding to appearance ratio peaks (see peaks 41,42,43 in FIG. 4) while reducing the size of the log to be analysed, which means that the effective frequency of an epiphenomenon in the new log can be increased so as to make it detectable as soon as this frequency reaches or exceeds the threshold frequency, while the frequency of the epiphenomenona would have been too low if learning had been done directly on the original log; by reducing the size using the procedure according to the invention, the frequency of the rare chronicle corresponding to the similarity type in the partial log, is increased above the threshold.

The essential phenomenon on which the invention is based is that if two parts, or alarm sequences, in the original alarm log contain instances of the same chronicles, then these parts must be relatively similar in that they must contain several elements in common and in a more or less similar order; if each of these parts is described by a set of parameters (forming a representation of the part), associated with various aspects of its content in alarms, then the similarity of parts results in the similarity (or proximity) of sets of parameters representative of these parts, in the parameters space. On the other hand, if these parts do not have chronicles in common, then the breakdown into parts according to the invention adds nothing that is not available with direct learning; however, in this case, the advantage of the invention is that it cannot be used for learning by trial and error.

More precisely, in a so-called general mode, the invention is an automatic method for learning frequent chronicles in an alarm log of a dynamic system, for supervision of this system, the alarms being associated with a plurality of events in a system with a plurality of types, characterised in that it comprises the following steps:

a) automatic selection and grouping of alarm sequences in the alarm log so as to form groups of sequences of similar alarms; and b) automatic generation of a partial alarm log for each group of sequences of similar alarms obtained in step a), starting from alarms belonging to sequences in this group; and c) automatic learning of frequent chronicles in each partial alarm log obtained in step b) so as to generate a partial set of frequent chronicles for each partial alarm log obtained in step b), and production of a set of frequent chronicles in the alarm log starting from frequent chronicles for each partial set of frequent chronicles obtained.

For example, it is possible to form the set of frequent chronicles in the alarm log by a union of chronicles of partial sets of frequent chronicles, which has the advantage that it eliminates none of the chronicles obtained during each partial log learning operation.

Obviously, other choices are possible, those skilled in the art would for example decide to eliminate chronicles with a frequency less than a given frequency (particularly when the threshold frequency is not the same for learning the various partial logs), or to eliminate chronicles containing some alarm types, etc.

Figure 5:
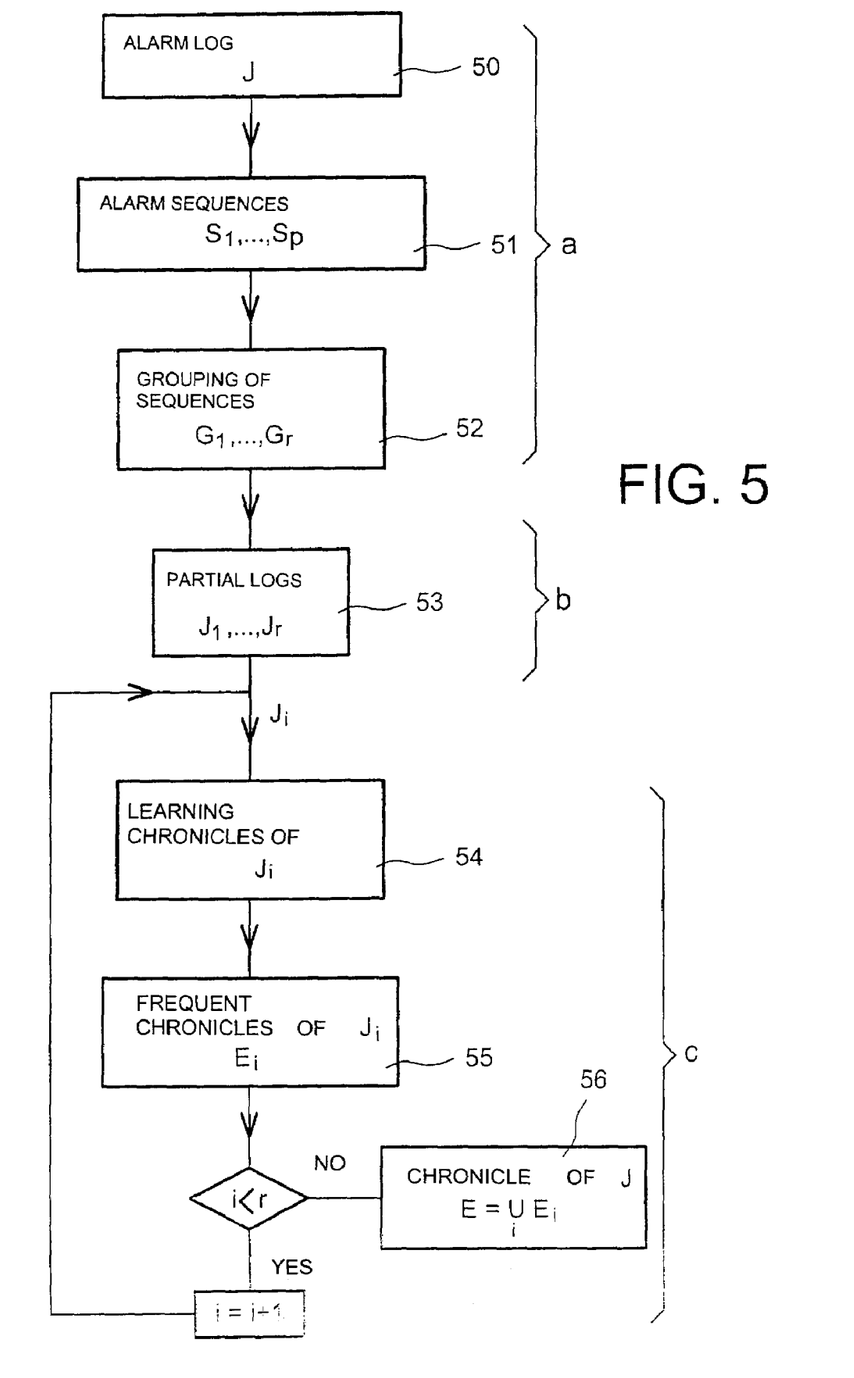
FIG. 5 is a block diagram showing learning of frequent chronicles according to the invention in its general mode.

This general mode is represented in FIG. 5: in an alarm log J 50, sequences of alarms 51 are selected $S_1, S_2, \ldots, S_p$ and are then grouped 52 into groups with similar sequences $G_1, G_2, \ldots, G_r$, thus executing step a) in the general mode. Group alarms are then used to produce 53 the partial logs $J_1, J_2, \ldots, J_r$ according to step b) in the general mode. Then, frequent chronicles 54 are learned in each transmitted partial log $J_i$ and the partial set $E_i$ of frequent chronicles of $J_i$ is determined 55, according to step C, in the general mode; finally, a set E of chronicles of log J is formed 56 starting from chronicles of the various partial sets $E_i$.

A comparison with FIG. 3 clearly shows the differences in learning chronicles according to prior art and according to the invention; direct learning of the log J in 30 and 31 to obtain all frequent chronicles in 32, is replaced by sequencing of J in 51, followed by grouping of similar sequences in 52, in order to produce the partial logs 53 on which 'partial' learnings are done in 54 and 55 so that frequent chronicles of the original log J can then be determined from chronicles in partial logs 56. Automatic grouping of similar sequences is an essential point of the invention because this is how the partial logs that are potentially rich in frequent chronicles are obtained.

The invention also relates to a device for using the new method described above, in other words a system for automatic learning of frequent chronicles in an alarm log of a dynamic system, for supervision of this system, comprising means of acquisition of alarms in the dynamic system and generation of an alarm log starting from acquired alarms, each alarm being associated with an event in the dynamic system obtained from among a plurality of events with a plurality of types and an occurrence date, means of transmission of the alarm log and chronicle learning means capable of using an automatic method for learning chronicles in an alarm log, with frequencies greater than or equal to an adjustable minimum frequency threshold $f_0$ and an adjustable maximum duration T, and that can transmit the chronicles obtained, characterised in that it also comprises:

an alarm sequence selection and grouping module capable of receiving an alarm log capable of selecting and grouping sequences of alarms in the alarm log, and capable of forming a group of similar alarm sequences and transmitting this group;

a module for producing a partial alarm log starting from the alarms of a group of similar alarm sequences received from the module that selects and groups alarm sequences in the alarm log, the module being capable of transmitting the partial alarm log obtained to the chronicle learning means;

a module for producing a set of frequent chronicles in the alarm log, from chronicles transmitted by chronicle learning means, the module being capable of transmitting chronicles from the set of frequent chronicles.

Figure 6:
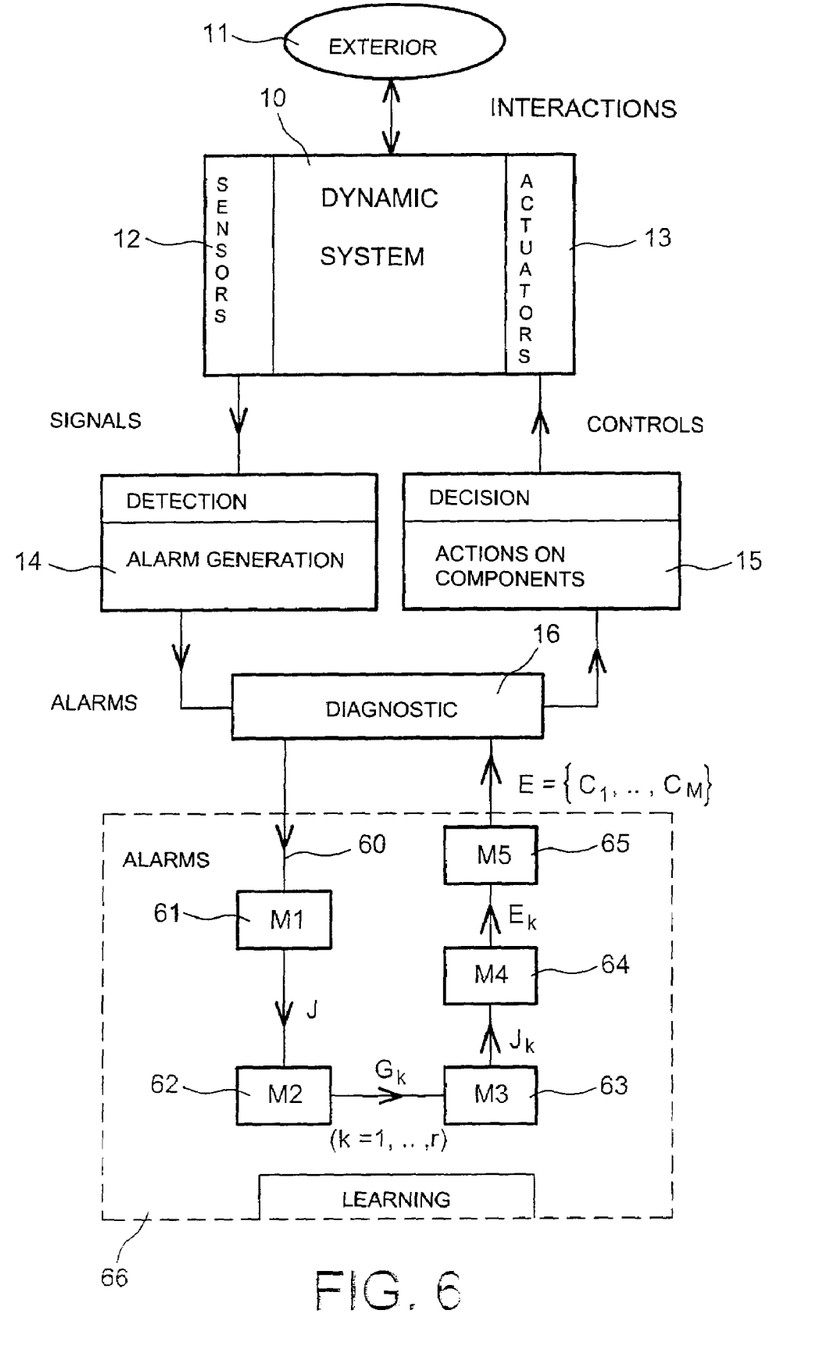
FIG. 6 is a block diagram showing a learning system according to the invention, in a supervision system for a dynamic system.

This learning system according to the invention is illustrated in FIG. 6: in this case, the learning system 66 is shown with reference to the diagnostic module 16 of a supervision system 17 of a dynamic system 10. Alarms 60 are transmitted to alarm acquisition means 61 and means of generating an alarm log J. The log J is transmitted to a module M2 for selection and grouping of alarm sequences 62. The module selects sequences $S_1, S_2, \ldots, S_p$ (with a variable number p) and forms groups of similar sequences $G_1, G_2, \ldots, G_r$ (with a variable number r); it transmits each group $G_k$, where k varies from 1 to r, to a module M3 producing a partial alarm log 63. Each partial log $J_k$, where $1 \leq k \leq r$, is generated from alarms of sequences in the corresponding group $G_k$. Module M3 transmits each partial log $J_k$ to the means M4 of learning frequent chronicles 64, with variable minimum frequency $f_0$ and maximum duration T, which then produce a partial set $E_k$ of frequent chronicles of $J_k$ containing a number M(k), that varies depending on the index k, of chronicles designated by $C_{1(k)}, \ldots, C_{M(k)}$. Finally, a module M5 for the production of a set of chronicles 65, generates a set E of chronicles of J starting from chronicles of all partial sets $E_k$ transmitted by the module M4. Module M5 then transmits the chronicles $C_1, \ldots, C_M$ of E so that they can be used by the supervision system. Those skilled in the art will note that modules M2 and M3 are not present in learning systems used in supervision systems according to prior art, and module M1 transmits the log J directly to the learning means M4 that directly produces the set E (therefore, module M5 is also absent).

BRIEF DESCRIPTION OF THE FIGURES

The characteristics and advantages of the invention presented above, and others that will become clear from the following description of particular embodiments given as examples, will become clear with reference to the attached drawings on which.

DETAILED PRESENTATION OF PARTICULAR EMBODIMENTS

Automatic selection of alarm sequences within an alarm log in step a) in the general mode of the invention is an important step in the method that can be carried out in several ways: for example, it is possible to use one sequence for each alarm in the log, therefore each sequence would contain an alarm, but in this case the number of sequences to be grouped would be very large.

Advantageously, in a so-called mode with breakdown, in step a) in the chronicle learning method according to the invention, alarm sequences are automatically selected by automatic breakdown of the alarm log into parts, each part being formed of alarms in the alarm log for which the occurrence dates are ordered in time and are included between a start date and end date associated with this part of the log, each part of the alarm log defining a selected alarm sequence in which the alarms belong to this part. This mode may be used to select sequences in step a) in the general mode.

The alarm log may be broken down into parts or time slots using several different methods: as non-limitative examples, the parts may have different or identical sizes (in terms of the number of alarms contained), they may have the same duration or variable durations, they may be separate or they may have alarms in common, they may form a partition of the alarm log in the set, or on the contrary they may ignore some alarms, etc.

Advantageously, the union of the parts of the alarm log will reconstitute the log so as not to lose any alarms that could belong to instances of chronicles at this stage in the learning method: any alarm in the log will then belong to at least one of the parts of the log.

According to one particular mode of the invention, called the mode with complete breakdown, the previous breakdown of the alarm log into parts is such that every alarm in the alarm log belongs to at least one of the parts of the alarm log. This mode has the advantage that it does not eliminate any alarm in the alarm log during the breakdown. This mode, combined with the with breakdown mode, may be used to select sequences in step a) in the general mode.

Sequences selected in step a) with similarities may be grouped using a similarity measurement in a space in which each alarm sequence is described by a set of parameters that may be seen as defining the coordinates of a point in this space called the sequence representation space. Each parameter in a sequence, or coordinate of the point representative of the sequence in the representation space, is associated with the description of the alarm content of the sequence in terms of a given alarm type. Thus, if there are A distinct alarm types to describe the content of the alarm sequences, the sequence representation space has A dimensions. The value of a coordinate of a sequence corresponds to the weight of the sequence in alarms of the type associated with this coordinate.

The importance of the choice of a data representation prior to grouping operations of these data, is well known to specialists in data classification. There is a very large number of possible representations for data depending on the characteristics attached to them: this variety of representations is reflected particularly by the different dimensions of the representation space.

One of the particular modes of the invention uses a so-called weighted representation in which each alarm sequence selected in step a) in the method is represented in the representation space with dimension A, by a point with A coordinates, the coordinate with rank j where j is any integer index between 1 and A, is equal to the number of times that the alarm type associated with index j appears in the alarm sequence.

Those skilled in the art know that the similarity measurement mentioned above used to calculate grouping of sequences using 'proximity' measurements of sequences in the representation space, particularly in classification method grouping algorithms, should be understood in the mathematical sense, in other words this measurement is not necessarily a distance (it does not have to respect triangular non-equality and the term semi-metric is then used, for example the cosine measurement that measures cosine of the angle between two vectors for which the components are the coordinates of the points representing the corresponding two sequences considered). However, this similarity measurement is usually a distance and is therefore capable of providing a metric for the representation space. Without being limitative., examples of metrics include the Minkowski metric (or distance) (that includes the Euclidian distance and the 'City-block' distance or the Manhattan distance as special cases), the Mahalanobis distance, the Chebychev distance, etc.

Points representing alarm sequences closest to each other in the sequence representation space form clusters, and each cluster corresponds to a group of sequences said to be similar. The proximity criterion for two points in the representation space being that if the similarity measurement of these points is less than or equal to a given threshold value, then the two points belong to the same cluster, and if the similarity measurement of these points is greater than the threshold value, then the two points belong to distinct clusters.

There is a very large number of data grouping algorithms at the moment, some of which even handle invariance (by linear transformations) of clusters due to prior normalisation of data.

In one advantageous embodiment of the invention called the with sequence grouping mode, step a) in the method consists of automatic grouping of alarm sequences to form groups of similar alarm sequences, using a grouping method. Therefore, this mode may be used for grouping in step a) in the general mode, and it may also be used jointly either with the with breakdown mode or with the with complete breakdown mode to perform step a) in the general mode.

The choice of how alarm sequences will be represented affects both the relevance of sequence groupings and the complexity of similarity measurement calculations to be made (due to the number of dimensions in the associated representation space). The content of an alarm sequence in the alarm log may be described more or less exhaustively: for example, if the log contains N distinct alarm types, then it will be possible to describe the alarm content of the sequence on the basis of these N alarm types, but it will also be possible to decide to describe this content based on a smaller number of alarm types and in this case some alarms (although they still appear in the sequence) corresponding to types missing from the representation, will not be described; however, in this case, the dimension of the representation space is smaller, which is advantageous from the point of view of the complexity of the grouping calculations.

Thus, in one particular mode of the learning method according to the invention, called the with type selection mode, groups of similar alarm sequences are formed in step a) with the following steps consisting of:
  representing each of the alarm sequences in the alarm log by its content, based on a set of alarm types with A elements taken from among distinct alarm types in the alarm log, with a number greater than or equal to A, in the alarm sequence representation space with dimension A; and
  automatically grouping alarm sequences in the alarm log and in the alarm sequence representation space, so as to form groups of similar alarm sequences. This mode is dependent on the general mode or the with breakdown mode or the with complete breakdown mode or the with grouping of sequences mode.

In particular, this with type selection mode may advantageously use the weighted representation of alarm sequences described above. Therefore, this with type selection mode can be used to form groups in step a) in the general mode, and it may also be used jointly either with the with breakdown mode or with the with complete breakdown mode or with the with grouping of sequences mode, possibly combined with one of the previous two modes, to perform step a) in the general mode.

Simple elimination of some of the alarm types present in the alarm log has the disadvantage that some alarms (eliminated types) are not described. To describe all alarms while reducing the number of dimensions in the alarm sequence representation space, it is possible for example firstly to group similar alarm types in the alarm log, particularly using a grouping method, to create groups of alarm types (the number S of groups being less than or equal to the initial number N of alarm types), and then to describe the content of the alarm sequences based on these S groups of alarm types. Thus, the number of dimensions in the representation space is only S, which is advantageous for grouping calculations and furthermore, any alarm in any sequence could always be described since its type appears in at least one of the S groups of types.

A simple example of a reduction in the number of types was given above for a telecommunication network: the two types of <<signal loss>> and <<transmission frame loss>> alarms may be described by a higher level type (usually resulting from a functional link between the types considered) which is <<transmission failure>>. A representation space is associated with the description of types, like in the general case of data processing (in this case data are alarm types in the alarm log).

An expert in the subject will note that everything described for the alarm sequences and the breakdown of an alarm log and the various processings of these entities can be transposed to alarm types by analogy, provided that there is an available representation of these types or sequences of types.

Some of the previous S groups can also be eliminated to retain only a small number S', the dimension of the representation space then being S'. These methods for reducing the representation space by grouping of types are then combined with a later grouping of alarm sequences to form groups of similar alarm sequences that can be used to generate partial logs in step b) of the learning method according to the invention.

Thus, in one particular embodiment of the learning method according to the invention called the with type grouping mode, groups of similar alarm sequences are formed in step a) consisting of the following steps:
  automatically grouping alarm types in the alarm log so as to form groups of similar alarm types, the result of grouping being a number S of groups of alarm types; and
  representing each alarm sequence in the alarm log by its content based on S' groups of alarm types, where the number S' is less than or equal to S obtained in the previous step, in an alarm sequence representation space with dimension S'; and
  automatically grouping alarm sequences in the alarm log in the alarm sequence representation space, so as to form groups of similar alarm sequences.

With type grouping mode can therefore be used to form groups in step a) in the general mode, and it may also be used jointly either with the with breakdown mode or with the with complete breakdown mode or with the with grouping of sequences mode, possibly combined with one of the two previous modes to perform step a) in the general mode.

In particular, automatic grouping of alarm sequences in the with type grouping mode may consist of automatically forming groups of similar sequences in the alarm log, each group of similar sequences being associated with a group of alarm types and resulting from the selection of alarm sequences in the alarm log for which the content of alarms of the same types as the types in the group of types considered exceeds a given threshold for this group. This grouping method has the advantage that it is very simple to implement.

In one particular embodiment of the learning method according to the invention called the type grouping with thresholds mode, groups of similar alarm sequences are formed in step a) using the following procedure:

automatically grouping alarm types in the alarm log so as to form groups of similar alarm types, the result of grouping being a number S of groups of alarm types; and representing each alarm sequence in the alarm log by its content based on a number S' of groups of alarm types less than or equal to S obtained in the previous step, in an alarm sequence representation space with dimension S'; and automatically forming groups of similar sequences in the alarm log, each group of similar sequences being associated with a group of alarm types and resulting from the selection of alarm sequences in the alarm log for which the content of alarms of the same type in the group of types considered exceeds a given threshold for this group.

Therefore the type grouping with thresholds mode can be used to form groups in step a) in the general mode, and it can also be used jointly either with breakdown mode or with complete breakdown mode to execute step a) in the general mode.

In one particular mode called with type grouping mode, it is also possible to group alarm types in the with type grouping mode or in the type grouping with threshold mode, by using a grouping method applicable to alarm types in the alarm log to form groups of similar alarm types. Those skilled in the art will do this by choosing a representation space for these alarm types, for which he could also reduce the number of dimensions using various methods described above but applied to types, and a similarity measurement so that he can then use one of many existing grouping algorithms (for example and non-limitatively, the Ascending Hierarchical Grouping, <<K-Means>>, <<Fuzzy K-Means>>, Gaussian mix, GTM <<Generative Topographic Mapping>>, GSOM <<Generative Self Organizing Map>> [7], Kohonen Map [9], Kohonen Self Organising Map [8,9] algorithms, etc.)

In some particular modes of the learning method according to the invention, this automatic grouping of alarm types using one of the grouping methods mentioned above (in the with type grouping mode) is advantageously done either using a grouping method based on a semantic map of alarm types (in other words each alarm is processed like a sequence of symbols, or text, and these sequences are grouped), or by a grouping method based on the accumulation profile in time (normalised or not), in the alarm log, for each alarm type.

In all embodiments of the invention, it is obviously possible to learn chronicles in partial alarm logs obtained after step b) in the method following a sequence of operations executed in series on a computer, during step c) in the method.

However, in one advantageous embodiment of the invention that can even further reduce the processing time and that is compatible with the various modes described, these learning operations in step c) are executed in parallel on a computer. These chronicle learning operations take up most of the time among the various operations related to other steps in the method according to the invention; however, it is clear that these operations can also be carried out in parallel to save time.

In the preferred embodiment of the invention, developed and used for supervision of a telecommunication system and used on a computer for step a) in the general mode, the alarm log is broken down using the with breakdown mode in which the broken down parts or 'time slots' all have the same duration $\Delta=2*T$, where T is the maximum duration of chronicles to be learned that is fixed for the execution of step c) in the method, the breakdown being such that any two consecutive parts have a time overlap equal to the value T. This particular breakdown is such that if any instance of a chronicle (with maximum length T) is statistically present in J, then it will also be present in at least part of J.

The alarm log J on which the method according to the invention is applied is broken down into p parts covering all alarms in the log, that may be assumed to be consecutive without restricting the general case; we will denote the i(th) part of the log as $\sigma_i$, for $1 \leq i \leq p$, then the start and the end dates associated with this part, $D_i$ and $F_i$ respectively, satisfy the relation:

$$D_i = D + T*(i-1)$$

$$F_i = D_i + \Delta,$$

where D denotes the start date of the alarm log J, and for the next (i+1)th part, the start and end dates respectively $D_{i+1}$ and $F_{i+1}$ satisfy:

$$D_{i+1} = D + T*i = D_i + T$$

$$F_{i+1} = D_{i+1} + \Delta = F_i + T.$$

Therefore, this breakdown is also conform with complete breakdown mode as can easily be checked.

We then classify the set of $\sigma_i$ values, where i varies from 1 to p, into r groups $G_k$, $1 \leq k \leq r$, using a grouping method based on Kohonen maps; each group $G_k$ (where $1 \leq k \leq r$) of similar parts (or corresponding alarm sequences) comprising a variable number of parts (or alarm sequences). Therefore, this final classification step applies to the with sequence grouping mode. In one preferred advantageous variant of the embodiment, the weighted representation is used to describe parts of J with a representation space comprising one dimension for each distinct alarm type in the log J.

In step b), a partial alarm log $J_k$ is made for each corresponding group Gk starting from the union of the parts, or corresponding alarm sequences, of the group. Thus, no alarm sequence is omitted in any group.

Finally, in step c), frequent chronicles are automatically learned using the FACE learning software on each partial alarm log $J_k$, $1 \leq k \leq r$, obtained above. Therefore for each partial log $J_k$, the result is a partial set $E_k$ composed of distinct frequent chronicles M(k) of $J_k$: $E_k = \{C_{1(k)}, \ldots, C_{M(k)}\}$ (where $C_{m(k)}$, $1 \leq m(k) \leq M(k)$, denotes a chronicle of $J_k$). The final result being the set E of frequent chronicles of J, where E is formed from the union of all partial sets $E_k$, for k=1, ..., r.

The FACE software [4,6] is a learning tool particularly well adapted to alarms and chronicles produced by telecommunication systems; however, other learning software is used in step c) in variants of the preferred embodiment.

The chronicles obtained will then be used by the diagnostic module of a supervision system for identification of situations characteristic of the behaviour of the supervised dynamic system.

In general, in the learning method for frequent chronicles in an alarm log according to the preferred embodiment:
- a maximum duration T of chronicles to be learned in step c) is fixed; and,
- in step a), the difference between the end date and the start date of any part of the alarm log is equal to 2*T; and, the parts are broken down in the alarm log such that for any given part with start date D', the part for which the subsequent start date D" is closest to D', if it exists, is such that its start date D" is equal to the date D' plus T; and, the alarm sequences obtained in the alarm log are grouped automatically using an algorithm based on Kohonen self-organising maps; and
- in step b), a partial alarm log is produced for each group of similar alarm sequences obtained in step a), from the union of alarm sequences in the group of similar alarm sequences; and
- in step c), the FACE learning system is used for automatically learning the chronicles. The preferred mode is a mode dependent on with complete breakdown mode and with sequence grouping mode.

REFERENCES

[1]: H. Mannila, H. Toivonen, A. I. Verkamo: 'Discovering frequent episodes in sequences', in Proc. 1$^{st}$ International Conference on Knowledge Discovery and Data Mining, pages 210-215, Montreal, Quebec, Canada (1995).

[2]: H. Mannila, H. Toivonen: 'Multiple uses of frequent sets and condensed representations', in Proc. 2$^{nd}$ International Conference on Knowledge Discovery and Data Mining, pages 189-194, Portland, Oreg., USA (1996).

[3]: R. Agrawal, H. Mannila, R. Srikant, H. Toivonen, A. I. Verkamo: 'Fast discovery of association rules' in Advances in Knowledge Discovery and Data Mining, pages 307-328, AAAI Press/the MIT Press (1996).

[4]: T. Vu Duong: 'Découverte de chroniques à partir de journaux d'alarmes. Application à la supervision de réseaux de télécommunications'(Discovery of chronicles from alarm logs. Application to supervision of telecommunication networks), Thesis in data processing and telecommunications, Institut National Polytechnique de Toulouse, presented to the public on Mar. 28, 2001.

[5]: R. Dechter, I. Meiri, J. Pearl: 'Temporal constraint networks', in Artificial Intelligence, Special Volume on Knowledge Representation, 49(1-3), 61-95 (1991). Elsevier.

[6]: C. Dousson, T. Vu Duong: 'Discovering chronicles with numerical time constraints from alarm logs for monitoring dynamic systems', in Proc. Of the 6$^{th}$ International Joint Conference on Artificial Intelligence (IJCAI 99), pp. 620-626, (1999).

[7]: J. J. Verbeek, N. Vlassis, and B. J. A. Kröse: 'The Generative Self-Organizing Map', IAS technical report IAS-UVA-02-03, May 2002 (website:http://www.science.uva.nl/research/ias/publications/reports/).

[8]: M. Dittenbach, D. Merkl, A. Rauber: 'The growing hierarchical self-organizing map', in International Joint Conference on Neural Networks (IJCNN 2000), volume vi, pages 15-19, Como, Italy, IEEE Computer Society (2000).

[9]: T. Kohonen: 'Self-Organizing Map', third edition (2002), Springer-Verlag.

The invention claimed is:

1. An automatic method for learning frequent chronicles in an alarm log, the alarms being associated with a plurality of events with a plurality of types, the method comprising:
   a) automatic selection and grouping of alarm sequences in the alarm log so as to form groups of similar alarm sequences;
   b) automatic generation of a partial alarm log for each group of similar alarm sequences obtained in operation a), starting from alarms belonging to sequences of the respective group; and
   c) automatic learning of frequent chronicles in each partial alarm log obtained in operation b) so as to generate a partial set of frequent chronicles for each partial alarm log obtained in operation b), and production of a set of frequent chronicles in the alarm log starting from frequent chronicles in each of the partial sets of frequent chronicles obtained.

2. The method according to claim 1, wherein alarm sequences are automatically selected by automatic breakdown of the alarm log into parts in operation a), each part being formed of alarms in the alarm log for which occurrence dates are ordered in time and are included between a start date and end date associated with this part of the log, each part of the alarm log defining a selected alarm sequence for which the alarms belong to this part.

3. The method according to claim 2, wherein the breakdown of the alarm log into parts is such that any alarm in the alarm log belongs to at least one of the parts of the alarm log.

4. The method according to claim 3, wherein automatic grouping of alarm sequences is made in operation a), using a grouping method to form groups of similar alarm sequences.

5. The method according to claim 4, wherein the groups of similar alarm sequences are formed in operation a), by:
   representing each of the alarm sequences in the alarm log by its content, based on a set of alarm types with A elements taken from among distinct alarm types in the alarm log, with a number greater than or equal to A, in an alarm sequence representation space with dimension A; and
   automatically grouping alarm sequences in the alarm log and in the alarm sequence representation space, so as to form groups of similar alarm sequences.

6. The method according to claim 5, wherein each alarm sequence selected in operation a) is represented in the representation space with dimension A, by a point with A coordinates, the coordinate with rank j, where j is any integer index between 1 and A, is equal to a number of times the alarm type associated with index j appears in the alarm sequence.

7. The method according to claim 4, wherein groups of similar alarm sequences are formed in operation a) by:
   automatically grouping alarm types in the alarm log so as to form groups of similar alarm types, the result of grouping being a number S of groups of alarm types;
   representing each alarm sequence in the alarm log by its content based on S' groups of alarm types obtained in the previous automatic groupers, where the number S' is less than or equal to S, in an alarm sequence representation space with dimension S'; and automatically grouping alarm sequences in the alarm log in the alarm sequence representation space, so as to form groups of similar alarm sequences.

8. The method according to claim 3, wherein the groups of similar alarm sequences formed in operation a) are formed by:

automatically grouping alarm types in the alarm log so as to form groups of similar alarm types, the result of grouping being a number S of groups of alarm types; and representing each alarm sequence in the alarm log by its content based on S' groups of alarm types, where the number S' is less than or equal to S obtained in the previous automatic groupers, in an alarm sequence representation space with dimension S'; and automatically forming groups of similar sequences in the alarm log, each group of similar sequences being associated with a group of alarm types and resulting from the selection of alarm sequences in the alarm log for which the content of alarms of the same type in the group of types considered exceeds a given threshold for this group.

9. The method according to claim 7, wherein the automatic grouping of alarm types in operation a) to form groups of similar alarm types, is made using a grouping method.

10. The method according to claim 8, wherein the automatic grouping of alarm types in operation a) to form groups of similar alarm types, is made using a grouping method.

11. The method according to claim 9, wherein automatic grouping of similar alarm types in the alarm log in operation a), is made using a grouping method based on a semantic map of alarm types.

12. The method according to claim 10, wherein automatic grouping of similar alarm types in the alarm log in operation a), is made using a grouping method based on a semantic map of alarm types.

13. The method according to claim 9, wherein automatic grouping of similar alarm types in the alarm log in operation a) is made using a grouping method based on an accumulation profile for each alarm type in time, in the alarm log.

14. The method according to claim 10, wherein automatic grouping of similar alarm types in the alarm log in operation a) is made using a grouping method based on the accumulation profile for each alarm type in time, in the alarm log.

15. The method according to claim 13, wherein learning on partial alarm logs obtained in operation b) is made in series, in operation c).

16. The method according to claim 14, wherein learning on partial alarm logs obtained in operation b) is made in series, in operation c).

17. The method according to claim 13, wherein learning on partial alarm logs obtained in operation b) is made in parallel, in operation c).

18. The method according to claim 14, wherein learning on partial alarm logs obtained in operation b) is made in parallel, in operation c).

19. The method according to claim 4, wherein:

a maximum duration T of chronicles to be learned in step operation c) is fixed, in operation a), the difference between the end date and the start date of any part of the alarm log is equal to 2*T, and, the parts are broken down in the alarm log such that for any given part with start date D', the part for which the subsequent start date D" is closest to D',if it exists, is such that its start date D" is equal to the date D' plus T, and, the alarm sequences obtained in the alarm log are grouped automatically using an algorithm based on Kohonen self-organizing maps, in operation b), a partial alarm log is produced for each group of similar alarm sequences obtained in operation a), from the union of alarm sequences in the group, of similar alarm sequences, and in operation c), the FACE learning system is used for automatically learning the chronicles.

20. A system for automatic learning of frequent chronicles in an alarm log comprising:

means for acquisition of alarms and generation of an alarm log starting from acquired alarms, each alarm being associated with one event from among a plurality of types and an occurrence date;

means for transmission of the alarm log and chronicle learning means for using an automatic method for learning frequent chronicles in an alarm log, with frequencies greater than or equal to an adjustable minimum frequency threshold and an adjustable maximum duration, and that can transmit the chronicles obtained;

an alarm sequence selection and grouping module configured to receive an alarm log and to select and group sequences of alarms in the alarm log, and configured to form a group of similar alarm sequences and to transmit this group;

a module for producing a partial alarm log starting from the alarms of a group of similar alarm sequences received from the module that selects and groups alarm sequences in the alarm log, the module configured to transmit the partial alarm log obtained to the chronicle learning means; and a module for producing a set of frequent chronicles in the alarm log, from chronicles transmitted by chronicle learning means, the module configured to transmit chronicles from the set of frequent chronicles.

* * * * *

UNITED STATES PATENT AND TRADEMARK OFFICE
CERTIFICATE OF CORRECTION

PATENT NO. : 7,388,482 B2  Page 1 of 1
APPLICATION NO. : 10/554303
DATED : June 17, 2008
INVENTOR(S) : Christophe Dousson et al.

It is certified that error appears in the above-identified patent and that said Letters Patent is hereby corrected as shown below:

Column 2, line 33, change "$[t^{31}, t^{+]}$" to --$[t^-, t^+]$--.

Signed and Sealed this

Tenth Day of March, 2009

JOHN DOLL
*Acting Director of the United States Patent and Trademark Office*